US009384606B2

(12) United States Patent
Miyazawa

(10) Patent No.: US 9,384,606 B2
(45) Date of Patent: Jul. 5, 2016

(54) PASSIVE KEYLESS SYSTEM

(71) Applicant: ALPS ELECTRIC CO., LTD., Tokyo (JP)

(72) Inventor: Akira Miyazawa, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 273 days.

(21) Appl. No.: 14/105,969

(22) Filed: Dec. 13, 2013

(65) Prior Publication Data

US 2014/0203906 A1 Jul. 24, 2014

(30) Foreign Application Priority Data

Jan. 18, 2013 (JP) ................................ 2013-007352

(51) Int. Cl.
*G06K 19/00* (2006.01)
*G07C 9/00* (2006.01)

(52) U.S. Cl.
CPC ........ *G07C 9/00111* (2013.01); *G07C 9/00309* (2013.01); *G07C 2009/0038* (2013.01); *G07C 2009/00388* (2013.01); *G07C 2009/00587* (2013.01); *G07C 2009/00793* (2013.01)

(58) Field of Classification Search
CPC ........... G07C 9/00571; G07C 9/00658; G08C 2201/50
USPC ........................... 340/5.61, 5.8, 5.2; 307/10.1
See application file for complete search history.

(56) References Cited

U.S. PATENT DOCUMENTS

2005/0024181 A1 2/2005 Hofbeck et al.
2008/0231417 A1* 9/2008 Kurpinski ........... B60R 25/2036 340/5.72
2014/0114503 A1* 4/2014 Ghabra .................... H04Q 9/00 701/2

* cited by examiner

*Primary Examiner* — Vernal Brown
(74) *Attorney, Agent, or Firm* — Brinks Gilson & Lione

(57) ABSTRACT

A passive keyless system includes an in-vehicle control unit, an in-vehicle transmitter wirelessly sending a request signal, a portable device that is activated by a battery, has a standby function of receiving a request signal, and sends an ID signal when the request signal is received, and an in-vehicle receiver receiving the ID signal. The in-vehicle control unit allows various operations of the vehicle when an authentication of the ID signal received by the in-vehicle receiver is established. When a remaining amount value of the battery is less than a reference value, the portable device can stop the standby function, can restore the standby function according to an operation using the portable device, and can stop the standby function again after the standby function is restored.

3 Claims, 10 Drawing Sheets

PASSIVE KEYLESS SYSTEM

CLAIM OF PRIORITY

This application claims benefit of priority to Japanese Patent Application No. 2013-007352 filed on Jan. 18, 2013, which is hereby incorporated by reference in its entirety.

BACKGROUND

1. Field of the Disclosure

The present disclosure relates to a passive keyless system, and more particular, a passive keyless system capable of suppressing power consumption of a portable device.

2. Description of the Related Art

In recent years, a passive keyless system is put to practical use which performs vehicle operations such as locking or unlocking of a door of a vehicle or start-up of an engine (hereinafter, abbreviated as vehicle operations) without using a mechanical key. In the passive keyless system, if a user is in possession of, for example, a portable device in a pocket of clothing or in a bag, the user is able to perform the vehicle operations described above without taking out and operating the mechanical key. As an example of such a system, a passive keyless system disclosed in Japanese Unexamined Patent Application Publication No. 2006-225975 is proposed.

FIG. 10 shows a passive keyless system of the related art according to Japanese Unexamined Patent Application Publication No. 2006-225975. As shown in FIG. 10, the passive keyless system of the related art includes a portable unit 201 (portable device), a mechanical key 202 that is detachably attached to the portable unit 201, and an in-vehicle system 203 mounted on a vehicle. The in-vehicle system 203 includes an in-vehicle control unit 230, in-vehicle transmitting means 231 and in-vehicle receiving means 232. The in-vehicle transmitting means 231 wirelessly sends a request signal to the portable unit 201. The portable unit 201 is activated by a battery. As the battery, for example, a button type battery is used. Then, the portable unit 201 wirelessly sends an ID signal in response to the request signal from the in-vehicle transmitting means 231. The in-vehicle receiving means 232 receives an ID signal from the portable unit 201. When an authentication of the ID signal received from the in-vehicle receiving means 232 is established, the in-vehicle control unit 230 allows vehicle operations using the portable unit 201. The mechanical key 202 is used as an emergency key.

Generally, in the passive keyless system, since battery replacement of a portable device is costly and takes effort, it is desirable that a period during which the portable device is usable without battery replacement, that is, a period, from when a new battery is installed in a portable device up to when the battery remaining amount becomes drained and the portable device becomes unusable, be at least a long time period.

However, in the passive keyless system of the related art according to Japanese Unexamined Patent Application Publication No. 2006-225975, the portable unit 201 (portable device) always waits for a request signal from the in-vehicle transmitting means 231 regardless of the remaining amount value of the battery. Therefore, the portable unit 201 always is needed to activate a circuit for reception, and power consumption of the portable unit 201 is large. If the power consumption of the portable unit 201 is large, the reduction in the remaining amount of the battery is accelerated. Since this become a factor to shorten a usable period of the portable unit 201, it is necessary to suppress the power consumption of the portable unit 201.

SUMMARY

A passive keyless system according to an aspect of the invention includes an in-vehicle control unit that is mounted on a vehicle; an in-vehicle transmitter that is mounted on the vehicle and wirelessly sends a request signal; a portable device that is activated by a battery, has a standby function of receiving a request signal, and sends an ID signal when the request signal is received; and an in-vehicle receiver that is mounted on the vehicle and receives the ID signal, in which the in-vehicle control unit allows various operations of the vehicle when an authentication of the ID signal received by the in-vehicle receiver is established, and when a remaining amount value of the battery is less than a reference value, the portable device can stop the standby function, can restore the standby function according to an operation using the portable device, and can stop the standby function again after the standby function is restored.

DESCRIPTION OF THE EXEMPLARY EMBODIMENTS

Hereinafter, embodiments of the present invention will be described with reference to drawings.

Figure 1:
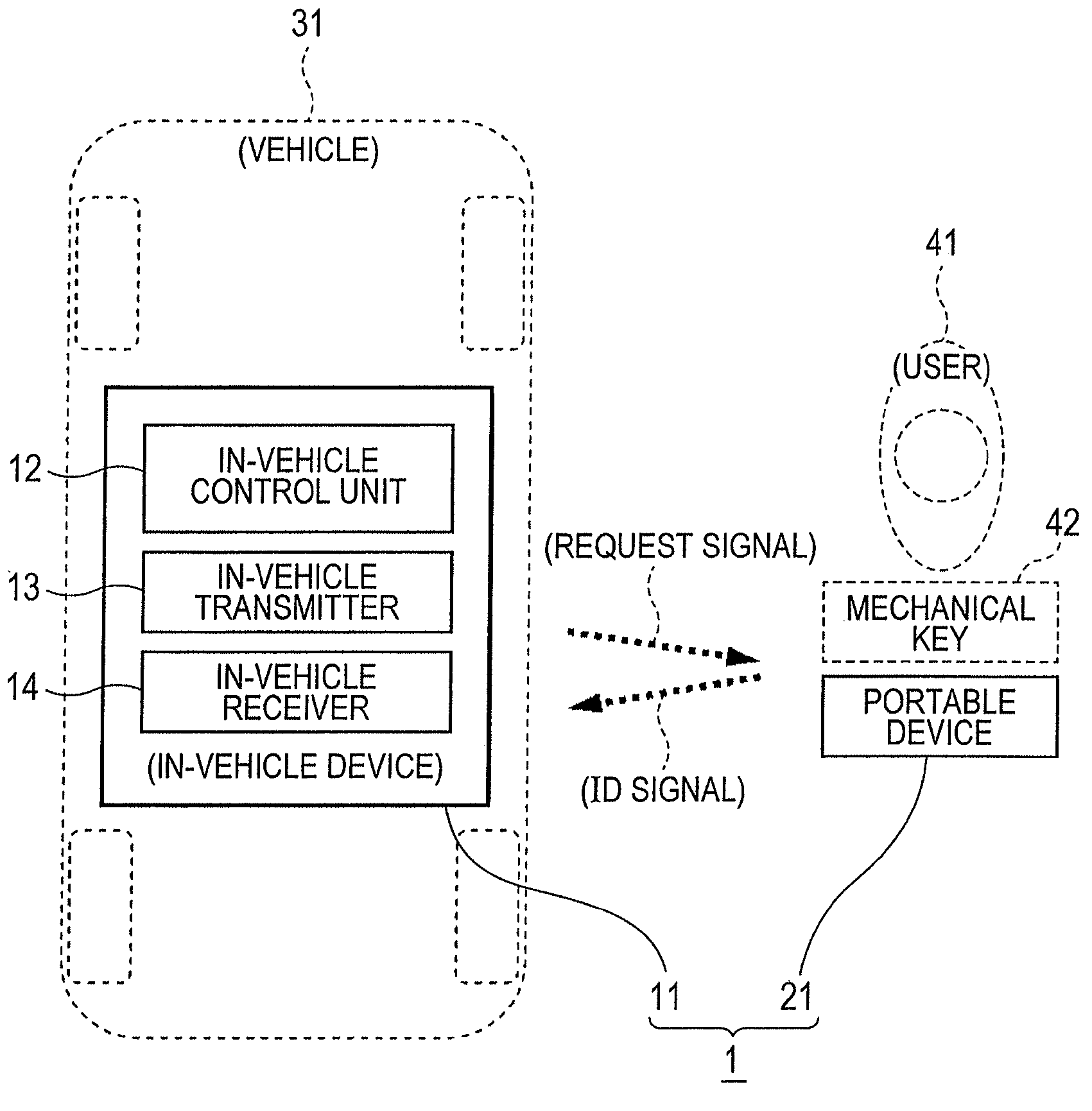
FIG. 1 is an explanatory diagram showing a configuration of a passive keyless system according to an embodiment of the present invention.
Figure 2:
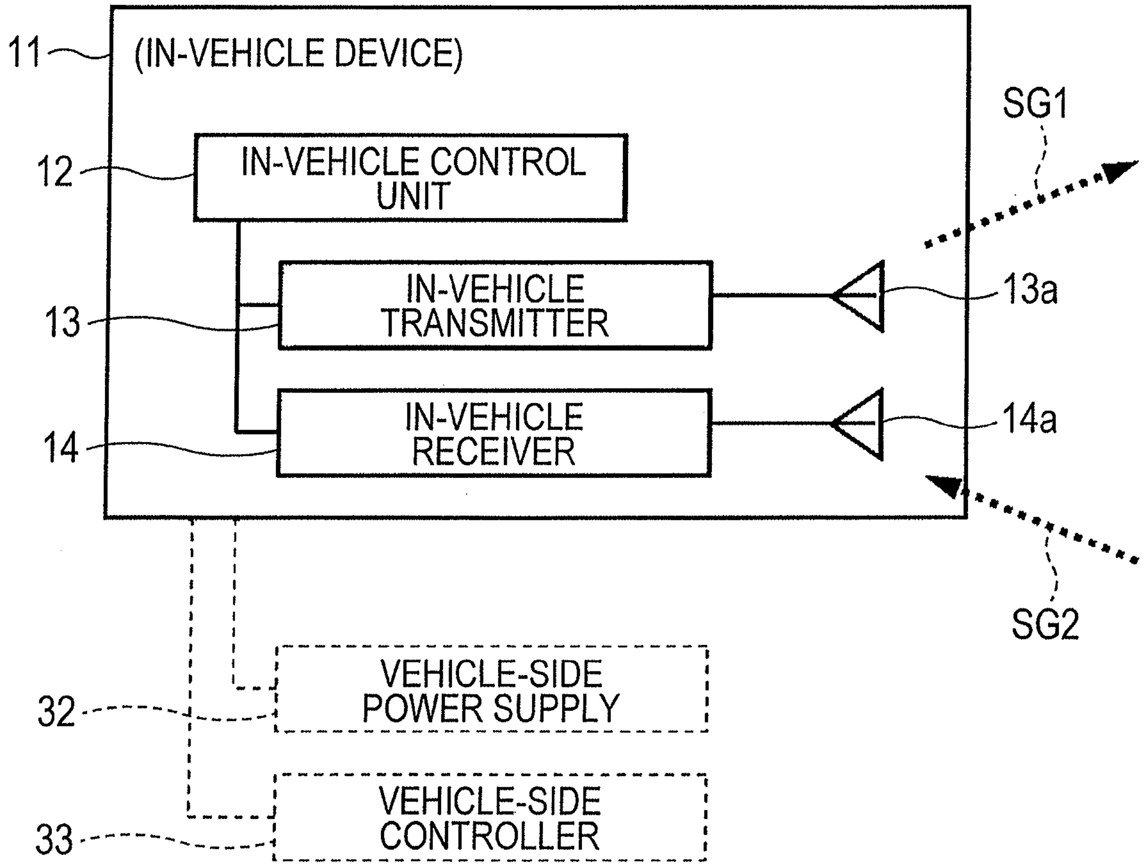
FIG. 2 is a block diagram showing a configuration of an in-vehicle device shown in FIG. 1.
Figure 3:
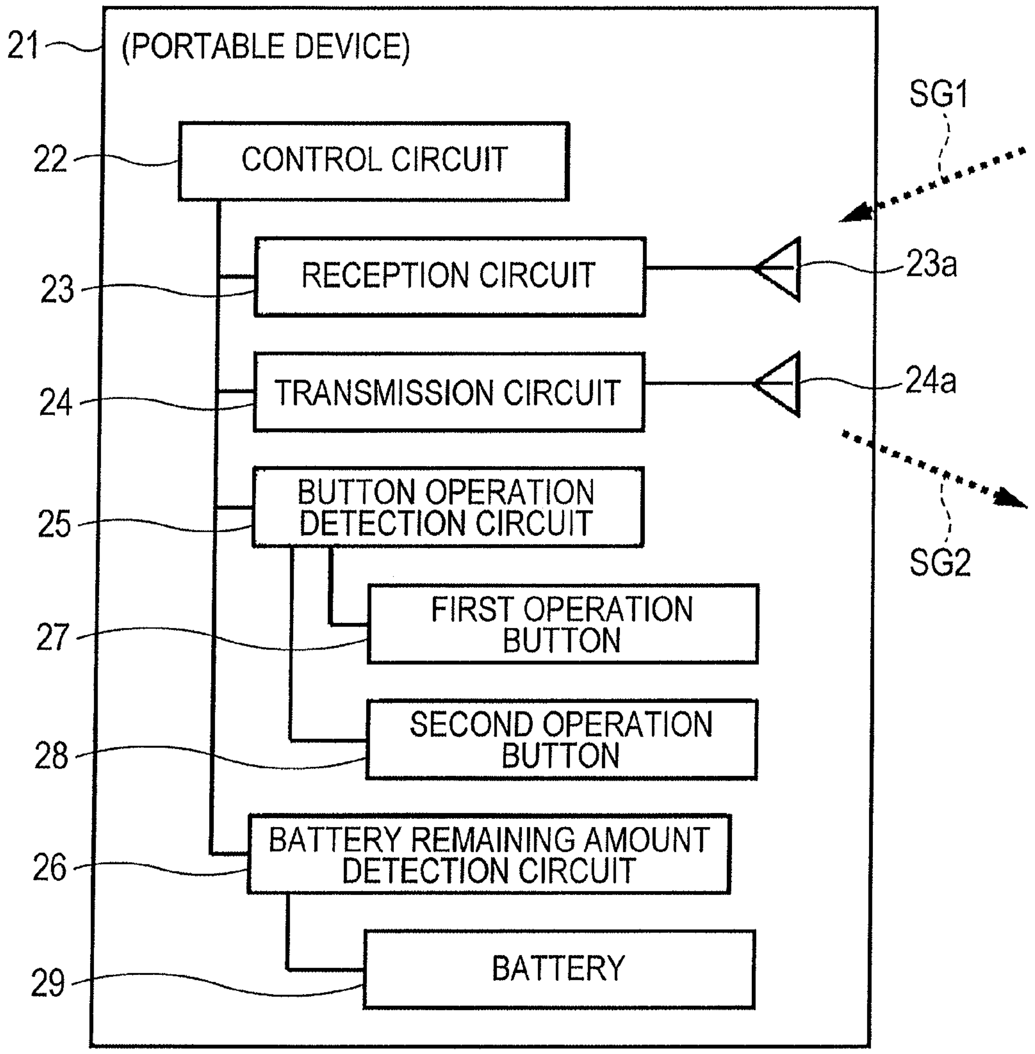
FIG. 3 is a block diagram showing a configuration of a portable device shown in FIG. 1.
Figure 4A:
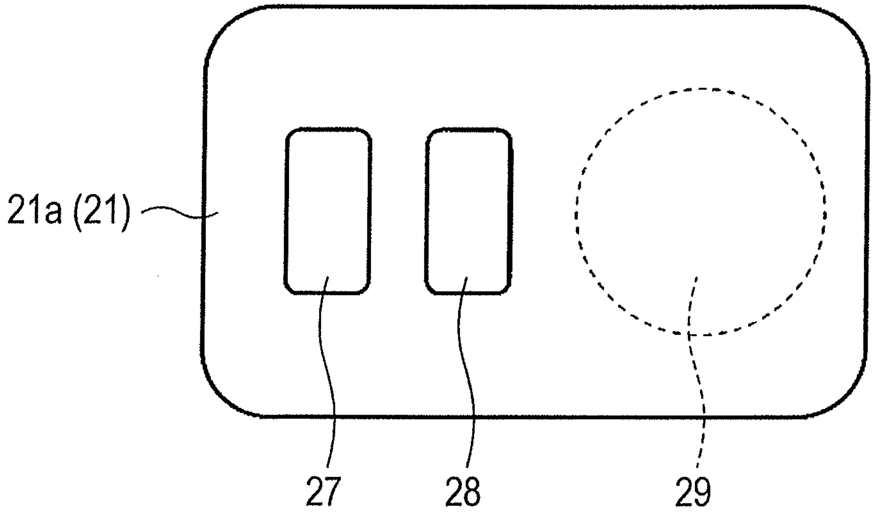
FIGS. 4A and 4B are explanatory diagrams showing a structure of the portable device shown in FIG. 1.
Figure 4B:
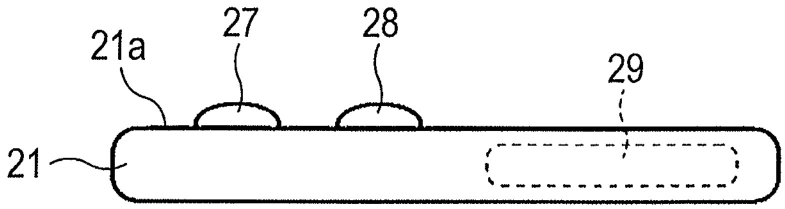

First, a configuration of a passive keyless system 1 according to embodiments of the present invention will be described using FIGS. 1 to 4A and 4B. FIG. 1 is an explanatory diagram showing a configuration of a passive keyless system 1 according to an embodiment of the present invention. FIG. 2 is a block diagram showing a configuration of an in-vehicle device 11 shown in FIG. 1. FIG. 3 is a block diagram showing a configuration of a portable device 21 shown in FIG. 1. FIGS. 4A and 4B are explanatory diagrams showing a structure of the portable device 21 shown in FIG. 1. FIG. 4A is a top view and FIG. 4B is a side view.

As shown in FIG. 1, the passive keyless system 1 includes an in-vehicle device 11 and a portable device 21. The in-vehicle device 11 includes an in-vehicle control unit 12, an in-vehicle transmitter 13, and an in-vehicle receiver 14. The in-vehicle device 11 is mounted on a vehicle 31. The user 41 is in possession of the portable device 21 and the mechanical key 42. Then, an authentication between the in-vehicle device 11 and the portable device 21 is performed. When the authentication between the in-vehicle device 11 and the portable device 21 is established, vehicle operations such as, for example, locking and unlocking of a door and start-up of an engine are possible without the mechanical key 42. The mechanical key 42 is used as an emergency key.

In the authentication between the in-vehicle device 11 and the portable device 21, first, the in-vehicle transmitter 13 of the in-vehicle device 11 sends a request signal for requesting the transmission of an ID signal to the portable device 21. The ID signal includes authentication information regarding the portable device 21 side. If the request signal is received, the portable device 21 sends the ID signal to the in-vehicle receiver 14 of the in-vehicle device 11. Then, the in-vehicle receiver 14 receives the ID signal, and the in-vehicle control unit 12 of the in-vehicle device 11 performs a comparison based on the ID signal. As a result of the comparison, when the authentication between the in-vehicle device 11 and the portable device 21 is established, the in-vehicle control unit 12 allows vehicle operations using the portable device 21. In this manner, the authentication between the in-vehicle device 11 and the portable device 21 is performed.

Next, the configuration of the in-vehicle device 11 will be described. As described above, the in-vehicle device 11 includes an in-vehicle control unit 12, an in-vehicle transmitter 13, and an in-vehicle receiver 14. Then, as shown in FIG. 2, the in-vehicle transmitter 13 and the in-vehicle receiver 14 are connected to the in-vehicle control unit 12.

The in-vehicle control unit 12 outputs an instruction regarding the transmission of a signal to the in-vehicle transmitter 13. In addition, the in-vehicle control unit 12 outputs an instruction regarding a reception of the signal to the in-vehicle receiver 14 and obtains information on the signal received by the in-vehicle receiver 14. In addition, the in-vehicle control unit 12 performs a comparison based on the obtained ID information and a determination based on the obtained various items of information.

The in-vehicle transmission antenna 13*a* is connected to the in-vehicle transmitter 13. Then, the in-vehicle transmitter 13 sends a first wireless signal SG1, according to the instruction of the in-vehicle control unit 12. For example, radio waves of frequencies in a Long-wave Frequency (LF) band are used for the first wireless signal SG1. As the first wireless signal SG1, signals such as, for example, the request signal described above and a confirmation signal for transferring the establishment of an authentication to the portable device 21 are sent from the in-vehicle transmitter 13.

The in-vehicle reception antenna 14*a* is connected to the in-vehicle receiver 14. Then, the in-vehicle receiver 14 receives a second wireless signal SG2 sent from the portable device 21, according to the instruction of the in-vehicle control unit 12. For example, radio waves of frequencies in an Ultra High Frequency (UHF) band are used for the second wireless signal SG2. As the second wireless signal SG2, signals such as, for example, the ID signal described above, an UNLOCK signal regarding unlocking of a door of a vehicle 31, and a LOCK signal regarding locking of a door of a vehicle 31 are sent from the portable device 21.

The in-vehicle device 11 is connected to the vehicle-side power supply 32 installed in the vehicle 31, and power from the vehicle-side power supply 32 is supplied thereto. The in-vehicle device 11 is further connected to the vehicle-side controller 33 installed in the vehicle 31. The vehicle-side controller 33 controls various devices in the vehicle 31 based on the information from the in-vehicle device 11.

Next, the configuration of the portable device 21 will be described. As shown in FIG. 3, the portable device 21 includes a control circuit 22, a reception circuit 23, a transmission circuit 24, a button operation detection circuit 25, a battery remaining amount detection circuit 26, a first operation button 27, a second operation button 28 and a battery 29. The reception circuit 23, the transmission circuit 24, the button operation detection circuit 25 and the battery remaining amount detection circuit 26 are connected to the control circuit 22. The control circuit 22, the reception circuit 23, the transmission circuit 24, the button operation detection circuit 25, and the battery remaining amount detection circuit 26 are integrally configured, for example, on the wiring board. As shown in FIGS. 4A and 4B, the portable device 21 has an outer shape of a substantially rectangular shape and a substantially flat operation surface 21*a*. The first operation button 27 and the second operation button 28 are mounted on, for example, the wiring board and disposed so as to be exposed from the operation surface 21*a* of the portable device 21. The battery 29 is incorporated interchangeably in the portable device 21.

The control circuit 22 outputs an instruction regarding the reception of a signal to the reception circuit 23, outputs an instruction regarding the transmission of a signal to the transmission circuit 24, and outputs an instruction regarding the confirmation of the battery remaining amount value to the battery remaining amount detection circuit 26. In addition, the control circuit 22 obtains various items of information from the reception circuit 23, the button operation detection circuit 25, and the battery remaining amount detection circuit 26, and performs various determinations based on the obtained information.

The portable device-side reception antenna 23*a* is connected to the reception circuit 23. Then, the reception circuit 23 receives the first wireless signal SG1 transmitted from the in-vehicle transmitter 13 according to the instruction of the control circuit 22. When the first wireless signal SG1 is received, the reception circuit 23 transfers information regarding the first wireless signal SG1 to the control circuit 22. As the first wireless signal SG1, as described above, signals such as the request signal and the confirmation signal are sent from the in-vehicle transmitter 13.

The portable device-side transmission antenna 24*a* is connected to the transmission circuit 24. Then, the transmission circuit 24 sends the second wireless signal SG2 to the in-vehicle receiver 14, according to the instruction of the control circuit 22. As the second wireless signal SG2, as described above, signals such as the ID signal, the UNLOCK signal and the LOCK signal are sent from the portable device 21.

The control circuit 22, the first operation button 27, and the second operation button 28 are connected to the button operation detection circuit 25. Then, the circuit is made from the button operation detection circuit 25, the first operation button 27, and the second operation button 28.

As the first operation button 27, for example, a pressing button type switch is used and a pressing operation is possible. Then, the first operation button 27 is used as a button for the first operation performed using the portable device 21. In the present embodiment, the first operation is set to an operation for sending an UNLOCK signal regarding unlocking of a door of a vehicle 31 (hereinafter, abbreviated as UNLOCK operation).

When the first operation button 27 is pressed, a portion of a circuit, which is made from the button operation detection circuit 25, the first operation button 27 and the second operation button 28 is switched. The button operation detection circuit 25 detects that the first operation is performed. Then, the button operation detection circuit 25 transfers information regarding the first operation to the control circuit 22. Then, the control circuit 22 outputs an instruction to the transmission circuit 24, and the transmission circuit 24 sends the UNLOCK signal regarding unlocking of a door of a vehicle 31 as well as the ID signal.

As the second operation button 28, for example, a pressing button type switch is used and a pressing operation is possible. Then, the second operation button 28 is used as a button for the second operation performed using the portable device 21. In the present embodiment, the second operation is set to an operation for sending a LOCK signal regarding locking of a door of a vehicle 31 (hereinafter, abbreviated as LOCK operation).

When the second operation button 28 is pressed, a portion of a circuit, which is made from the button operation detection circuit 25, the first operation button 27 and the second operation button 28 is switched. The button operation detection circuit 25 detects that the second operation is performed. Then, the button operation detection circuit 25 transfers information regarding the second operation to the control circuit 22. Then, the control circuit 22 outputs an instruction to the transmission circuit 24, and the transmission circuit 24 sends the LOCK signal regarding locking of a door of a vehicle 31 as well as the ID signal.

The battery remaining amount detection circuit 26 is connected to the battery 29 and supplied with power from the battery 29. The battery remaining amount detection circuit 26 confirms the remaining amount value of the battery 29 according to the instruction of the control circuit 22, and transfers information regarding the confirmed battery remaining amount value to the control circuit 22. In addition, the battery remaining amount detection circuit 26 is also connected to the control circuit 22, the reception circuit 23, the transmission circuit 24, and the button operation detection circuit 25. The battery 29 supplies power to the control circuit 22, the reception circuit 23, the transmission circuit 24, and the button operation detection circuit 25 through the battery remaining amount detection circuit 26.

As the battery 29, for example, a button type battery is used. When the battery 29 is new and the battery remaining amount is sufficient, the portable device 21 is activated without any problem. While the battery 29 continues to be used, the battery remaining amount is reduced. For example, a functional decline such as a decrease in output of the second radio signal SG2 sent by the transmission circuit 24 occurs. If the battery 29 continues to be used further, the battery remaining amount is significantly reduced and it becomes a state at which the function of the portable device 21 cannot be used. Then, the battery 29 is removed from the portable device 21 and replaced with a new battery. Hereinafter, a description will be given by defining a period from when a new battery 29 is mounted on the portable device 21 up to when the remaining amount of the battery 29 is reduced and the portable device 21 cannot maintain functions thereof and becomes unusable during a period in which the portable device 21 is usable without battery replacement.

Next, the operation mode of the portable device 21 will be described. The portable device 21 has two operation modes, which are the standby mode and the sleep mode. The standby mode is an operation mode of the portable device 21 when the remaining amount of the battery 29 is sufficient. The sleep mode is an operation mode of the portable device 21 when the remaining amount of the battery 29 is reduced. The portable device 21 is switched between the standby mode and the sleep mode in response to the remaining amount value of the battery 29. When the remaining amount value of the battery 29 is the reference value or more (hereinafter, abbreviated as the normal time), the portable device 21 is in the standby mode. When the remaining amount of the battery 29 is reduced and the battery remaining amount value is less than the reference value (hereinafter, abbreviated as the time of low battery amount), the portable device 21 transits to the sleep mode.

The reference value of the battery remaining amount value can be set appropriately according to the standard required by the passive keyless system 1. For example, the reference value is set to be able to transit to the sleep mode at a stage before the functional decline of the portable device 21 begins to occur due to decrease in the battery remaining amount.

In the standby mode, the portable device 21 activates the reception circuit 23 to provide a state of being able to always receive the first wireless signal SG1 from the in-vehicle device 11. Then, the reception circuit 23 becomes able to wait for the request signal and the confirmation signal using the first wireless signal SG1 from the in-vehicle device 11. Hereinafter, a description will be given by abbreviating a function of making a state of being able to always receive the first wireless signal SG1 and to wait for the request signal and the confirmation signal as a standby function. In response to actuation of the standby function, the control circuit 22 performs a determination on the presence or absence of reception of the request signal. When the reception circuit 23 receives the request signal, the transmission circuit 24 sends an ID signal according to the instruction of the control circuit 22. In this manner; although the portable device 21 becomes able to wait for the request signal from the in-vehicle transmitter 13 in the standby mode, the reception circuit 23 is activated and the control circuit 22 performs a determination on the presence or absence of reception of the request signal, and thus the power consumption of the portable device 21 is increased by the amount of the power consumption due to these operations.

In the sleep mode, the portable device 21 becomes a state where predetermined functions including the standby function are stopped and only minimum functions required for waiting is activated. The reception circuit 23 is stopped and waiting for the request signal is not performed. The control circuit 22 is activated, but does not perform a determination on the presence or absence of reception of the request signal. Therefore, in the sleep mode, the portable device 21 is not able to wait for the request signal from the in-vehicle transmitter 13, thereby suppressing the power consumption of the portable device 21.

Even when the portable device 21 is in the sleep mode, the button operation detection circuit 25 is activated. Then, when the first operation button 27 is pressed, the first operation as the UNLOCK operation is performed. Then, if the first operation is performed when the portable device 21 is in the sleep mode, the portable device 21 is set to restore the standby function and to transit from the sleep mode to the standby mode after the first operation is performed.

In addition, if the second operation is performed when the first operation is performed and the portable device 21 is in the standby mode at the time of low battery amount, the portable device 21 is set to stop the standby function again and to transit from the standby mode to the sleep mode after the second operation is performed.

Next, the vehicle operations after authentication between the in-vehicle device 11 and the portable device 21 is established will be described. As described above, when an authentication between the in-vehicle device 11 and the portable device 21 is established, vehicle operations such as, for example, locking and unlocking of a door and start-up of an engine are possible without the mechanical key 42.

First, unlocking of a door of a vehicle 31 will be described. The in-vehicle transmitter 13 periodically sends the request signal using the first wireless signal SG1. Then, if the user 41 possessing the portable device 21 approaches the vehicle 31, the portable device 21 comes to a distance at which the request signal can be received and authentication between the in-vehicle device 11 and the portable device 21 is performed. When an authentication between the in-vehicle device 11 and the portable device 21 is established, the in-vehicle control unit 12 outputs an instruction regarding unlocking of a door to the vehicle-side controller 33, and the vehicle-side controller 33 unlocks the door of the vehicle 31. For example, the user 41 can open the door of the vehicle 31 by pulling the doorknob of vehicle 31.

Next, the start-up of an engine will be described. When an authentication between the in-vehicle device 11 and the portable device 21 is established, for example, the engine of the vehicle 31 is able to start by only operating an engine start switch disposed on the vehicle 31.

Next, the locking of a door of a vehicle 31 will be described. Even after an authentication between the in-vehicle device 11 and the portable device 21 is established, the in-vehicle receiver 14 and the portable device 21 transceive the second wireless signal SG2 periodically therebetween. However, after the driving of the vehicle 31 is completed, if the user 41 possessing the portable device 21 moves away from the vehicle 31, the second wireless signal SG2 from the portable device 21 does not reach the in-vehicle receiver 14. If the state continues for a predetermined time, the in-vehicle control unit 12 determines that a series of vehicle operations are completed and automatically releases authentication between the in-vehicle device 11 and the portable device 21. Then, after the authentication is released, the in-vehicle control unit 12 outputs an instruction regarding the locking of a door to the vehicle-side controller 33 and the vehicle-side controller 33 locks the door of the vehicle 31.

Figure 5A:
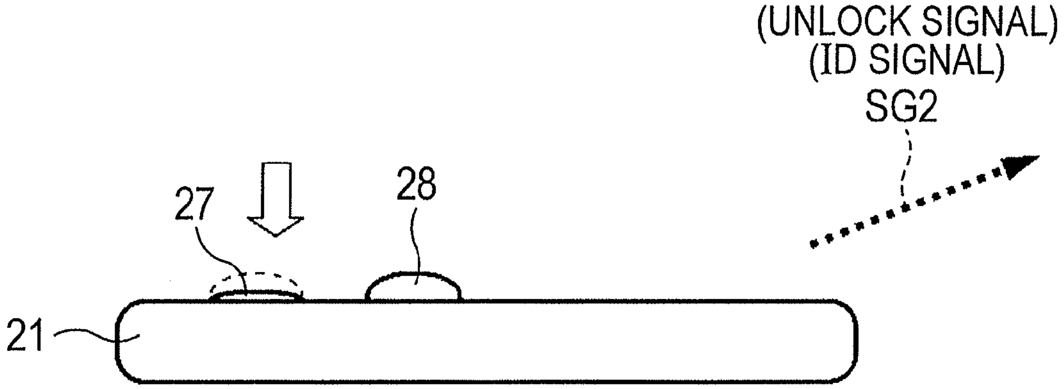
FIGS. 5A and 5B are explanatory diagrams showing a vehicle operation using a first operation button and a second operation button shown in FIGS. 4A and 4B.
Figure 5B:
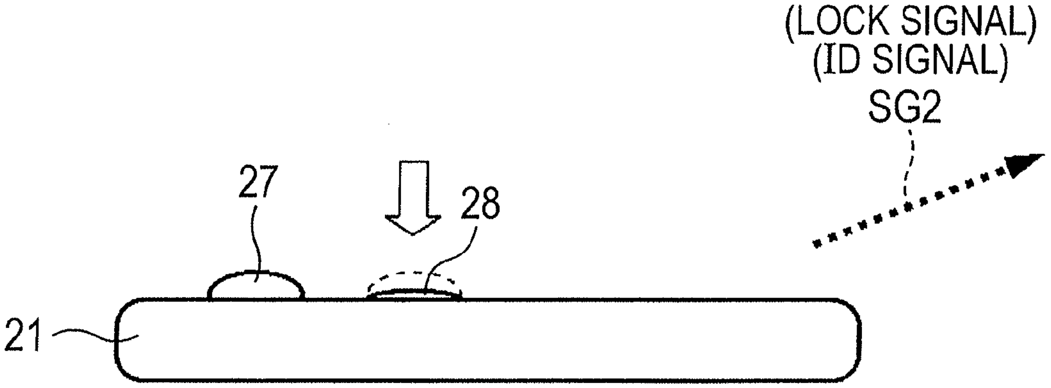

Next, the vehicle operation using the first operation button 27 and the second operation button 28 of the portable device 21 will be de described using FIGS. 5A and 5B. FIGS. 5A and 5B are explanatory diagrams showing the vehicle operation using the first operation button 27 and the second operation button 28 shown in FIGS. 4A and 4B. FIG. 5A is a side view explaining an operation regarding the first operation button 27, and FIG. 5B is a side view explaining the operation regarding the second operation button 28.

The first operation button 27 is a button for the first operation as the UNLOCK operation as described above. As shown in FIG. 5A, when the first operation button 27 is pressed, the portable device 21 sends the UNLOCK signal and the ID signal using the second wireless signal SG2. Although not shown, on the in-vehicle device 11 side, the in-vehicle receiver 14 receives the UNLOCK signal and the ID signal. Then, the in-vehicle control unit 12 performs a comparison based on the received ID signal. When an authentication between the in-vehicle device 11 and the portable device 21 is established, the in-vehicle control unit 12 outputs an instruction regarding the unlocking of a door to the vehicle-side controller 33 and the vehicle-side controller 33 unlocks the door of the vehicle 31.

Further, as described above, even when the portable device 21 is in the sleep mode at the time of low battery amount, the first operation is possible. Then, if the first operation button 27 is pressed and the first operation is performed when the portable device 21 is in the sleep mode, after the first operation is performed, the portable device 21 restores the standby function and transits from the sleep mode to the standby mode.

The second operation button 28 is a button for the second operation as the LOCK operation as described above. As shown in FIG. 5B, when the second operation button 28 is pressed, the portable device 21 sends the LOCK signal and the ID signal using the second wireless signal SG2. Although not shown, on the in-vehicle device 11 side, the in-vehicle receiver 14 receives the LOCK signal and the ID signal. Then, the in-vehicle control unit 12 performs a comparison based on the received ID signal. When an authentication between the in-vehicle device 11 and the portable device 21 is established, the in-vehicle control unit 12 outputs an instruction regarding the locking of a door to the vehicle-side controller 33 and the vehicle-side controller 33 locks the door of the vehicle 31.

Further, as described above, when the first operation is performed at the time of low battery amount and the portable device 21 is in the standby mode, if the second operation button 28 is pressed and the second operation is performed, after the second operation is performed, the portable device 21 stops the standby function again and transits from the standby mode to the sleep mode.

Figure 6:
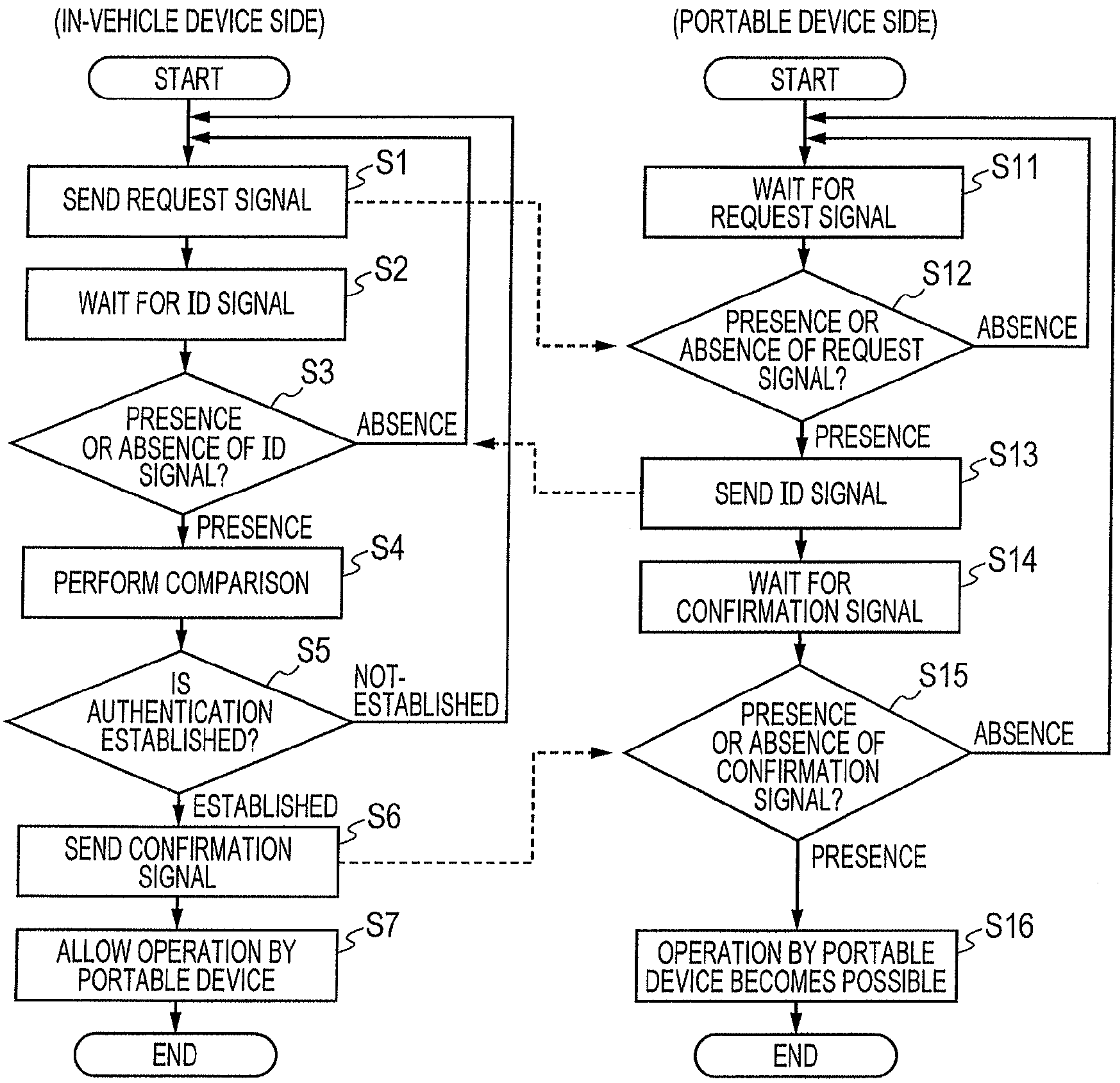
FIG. 6 is a flowchart of an authentication procedure of a passive keyless system shown in FIG. 1.

Next, an authentication procedure of a passive keyless system 1 will be described with reference to FIG. 6. FIG. 6 is a flowchart illustrating the authentication procedure of the passive keyless system 1 shown in FIG. 1. Referring to FIG. 6, steps S1 to S7 correspond to the authentication procedure of the in-vehicle device 11 side and steps S11 to S16 correspond to the authentication procedure of the portable device 21 side.

The passive keyless system 1 performs an authentication between the in-vehicle device 11 and the portable device 21 according to the procedure, for example, shown in FIG. 6. First, in the in-vehicle device 11 side, the in-vehicle transmitter 13 sends a request signal periodically (step S1). Then, the in-vehicle receiver 14 waits for an ID signal from the portable device 21 (step S2).

On the portable device 21 side, the reception circuit 23 is waiting for a request signal from the in-vehicle transmitter 13 (step S11). Then, in response to step S1, the control circuit 22 performs a determination based on the presence or absence of reception of the request signal (step S12). If there is no reception of the request signal in step S12, the procedure returns to step S11 and the reception circuit 23 continues to wait for the request signal. If there is reception of the request signal in step S12, the transmission circuit 24 sends the ID signal to the in-vehicle receiver 14 (step S13). Then, the reception circuit 23 waits for a confirmation signal on the establishment of an authentication from the in-vehicle transmitter 13 (step S14).

On the in-vehicle device 11 side, in response to step S13, the in-vehicle control unit 12 performs a determination based on the presence or absence of reception of an ID signal (step S3). If there is no reception of the ID signal within a predetermined time in step S3, the procedure returns to step S1 and the in-vehicle transmitter 13 sends periodically the request signal again. If there is reception of the ID signal within a predetermined time in step S3, the in-vehicle control unit 12 performs a comparison based on the ID signal (step S4). Then, the in-vehicle control unit 12 performs a determination based on the comparison result (step S5). If the comparison result is "authentication failure" in step S5, the procedure returns to step S1 and the in-vehicle transmitter 13 sends periodically the request signal again. If the comparison result is "authentication established" in step S5, the in-vehicle transmitter 13 sends the confirmation signal on the establishment of an authentication to the portable device 21 (step S6). Then, the in-vehicle control unit 12 allows the vehicle operation by the portable device 21 (step S7).

On the portable device 21 side, in response to step S6, the control circuit 22 performs a determination based on the presence or absence of reception of a confirmation signal (step S15). If there is no reception of the confirmation signal within a predetermined time in step S15, the procedure returns to step S11 and the reception circuit 23 waits for the request signal again. If there is reception of the confirmation signal within a predetermined time in step S15, the vehicle operation by the portable device 21 becomes possible (step S16).

Although a procedure to release the authentication between the in-vehicle device 11 and the portable device 21 is not shown, for example, as described above, if the user 41 possessing the portable device 21 moves away from the vehicle 31, the authentication between the in-vehicle device 11 and the portable device 21 is automatically released. Further, for example, if a second operation as a LOCK operation is performed after the driving of the vehicle 31 is completed, the authentication between the in-vehicle device 11 and the portable device 21 is released after the second operation is performed.

Figure 7:
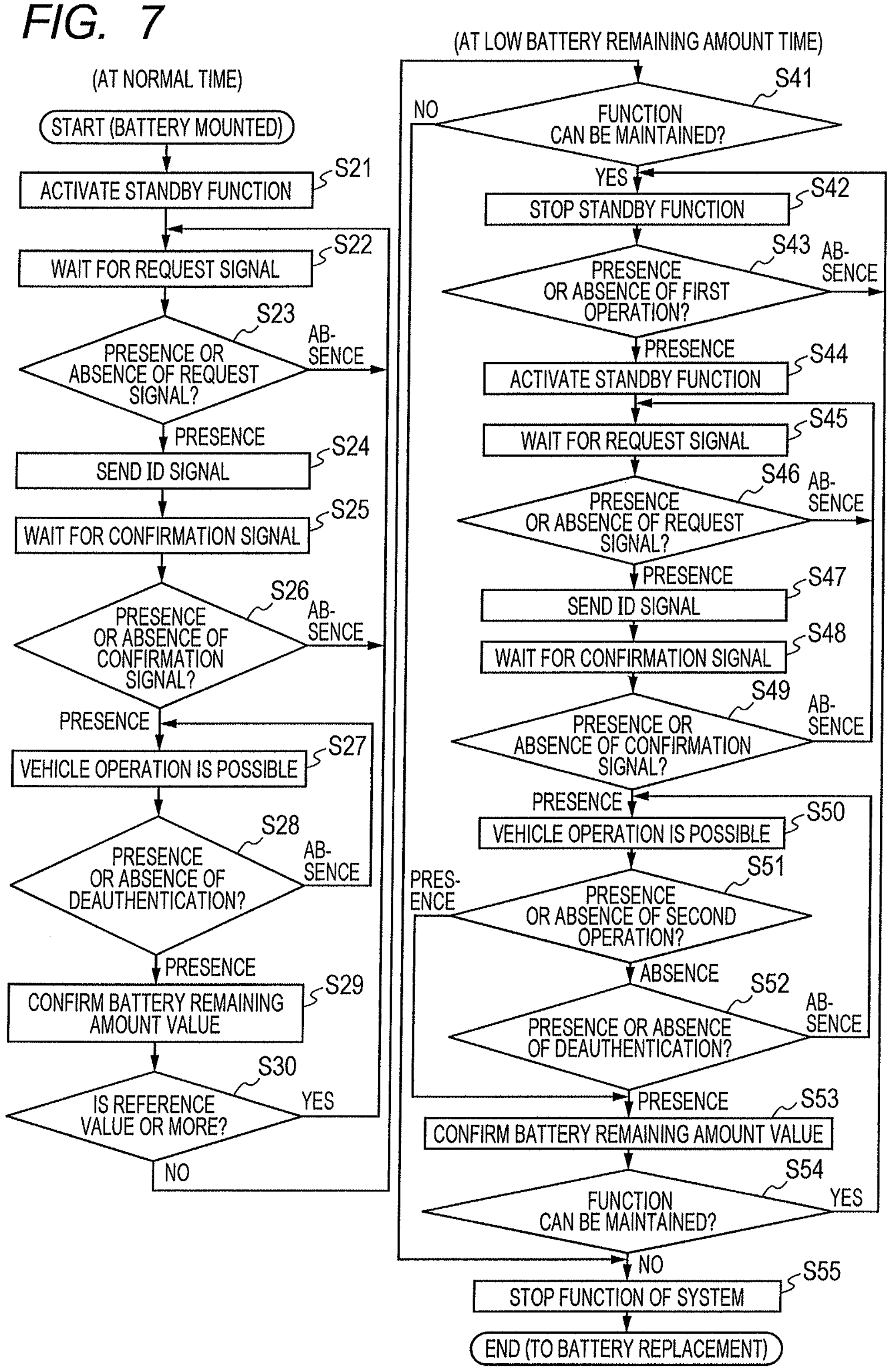
FIG. 7 is a flowchart showing an operation procedure of the portable device shown in FIG. 1.

Next, the operation of the portable device 21 including the authentication procedure described above will be described with reference to FIG. 7. FIG. 7 is a flowchart showing the operation procedure of the portable device 21 shown in FIG. 1. FIG. 7 shows the operation from when a new battery 29 is mounted on the portable device 21 up to when the remaining amount of the battery 29 is reduced and the portable device 21 cannot maintain functions thereof. In FIG. 7, steps S21 to S30 correspond to the operation at the normal time. Steps S41 to S55 correspond to the operation at the low battery amount time. Since FIG. 7 shows an operation procedure including the operations other than the authentication procedure, even steps showing the same operations as in the steps shown in FIG. 6 are denoted by different numerical references.

In the present embodiment, the portable device 21 operates according to, for example, the procedure shown in FIG. 7. First, a new battery 29 is mounted on the portable device 21 and the portable device 21 starts an operation in the standby mode. The portable device 21 activates the standby function (step S21). Then, the reception circuit 23 waits for a request signal from the in-vehicle transmitter 13 (step S22).

Next, the control circuit 22 performs a determination based on the presence or absence of reception of the request signal (step S23). If there is no reception of the request signal in step S23, the procedure returns to step S22 and the reception circuit 23 continues to wait for the request signal. If there is reception of the request signal in step S23, the transmission circuit 24 sends an ID signal to the in-vehicle receiver 14 (step S24). Then, the reception circuit 23 waits for a confirmation signal on the establishment of an authentication from the in-vehicle transmitter 13 (step S25).

Next, the control circuit 22 performs determination based on the presence or absence of the confirmation signal (step S26). If there is no reception of the confirmation signal within a predetermined time in step S26 (a case where an authentication is not established), the procedure returns to step S22 and the reception circuit 23 waits for the request signal again. If there is reception of the confirmation signal within a predetermined time in step S26 (a case where an authentication is established), the vehicle operations using the portable device 21 become possible and a series of vehicle operations using the portable device 21 are performed (step S27).

Next, the control circuit 22 performs a determination based on the presence or absence of deauthentication (step S28). If there is no deauthentication in step S28, the control circuit 22 determines that a series of vehicle operations continue and the procedure returns to step S27. Then, the vehicle operations by the portable device 21 can be performed continuously. If there is deauthentication in step S28, the control circuit 22 determines that a series of vehicle operations are completed. Then, the battery remaining amount detection circuit 26 of the portable device 21 confirms the remaining amount value of the battery 29 (step S29).

Next, the control circuit 22 performs a first determination base on the battery remaining amount value of a battery 29 (determination as to whether the battery remaining amount value is a reference value or more) (step S30). In step S30, if the battery remaining amount value is the reference value or more, the procedure returns to step S22 and the reception circuit 23 waits for the request signal from the in-vehicle device 11 again. In step S30, if the battery remaining amount value is less than the reference value, the procedure moves to step S41 and the portable device 21 transits to the operation at the time of low battery amount.

Next, the operation of the portable device 21 at the time of low battery amount will be described. If the battery remaining amount value is less than the reference value in step 30 of the operation at the normal time, as described above, the procedure proceeds to step S41. Then, the control circuit 22 performs a second determination based on the remaining amount value of the battery 29 (determination as to whether the function of the portable device 21 can be maintained). If the battery remaining amount value is at a level at which the function of the portable device 21 cannot be maintained in step S41, the procedure proceeds to step S54 and the portable device 21 stops the function of the passive keyless system 1. If the battery remaining amount value is at a level at which the function of the portable device 21 can be maintained in step S41, the portable device 21 stops the standby function and transits to the sleep mode. Then, the portable device 21 waits in the sleep mode (step S42).

Next, the control circuit 22 performs determination based on the presence or absence of the first operation as the UNLOCK operation (step S43). If the first operation is not performed in step S43, the procedure returns to step S42 and the portable device 21 continues to wait in the sleep mode. If the first operation is performed in step S43, after the first operation has been performed, the portable device 21 restores the standby function and transits to the standby mode (step S44). Then, the reception circuit 23 waits for the request signal from the in-vehicle transmitter 13 (step S45).

Next, the control circuit 22 performs a determination based on the presence or absence of the reception of the request signal (step S46). If there is no reception of the request signal in step S46, the procedure returns to step S45 and the reception circuit 23 continues to wait for the request signal. If there is reception of the request signal in step S46, the transmission circuit 24 sends an ID signal to the in-vehicle receiver 14 (step S47). Then, the reception circuit 23 waits for a confirmation signal on the establishment of an authentication from the in-vehicle transmitter 13 (step S48).

Next, the control circuit 22 performs a determination based on the presence or absence of the confirmation signal (step S49). If there is no reception of the confirmation signal within a predetermined time in step S49 (a case where authentication is not established), the procedure returns to step S45 and the reception circuit 23 waits for the request signal again. If there is reception of the confirmation signal within a predetermined time in step S49 (a case where authentication is established), the vehicle operations using the portable device 21 becomes possible and a series of vehicle operations using the portable device 21 are performed (step S50).

Next, the control circuit 22 performs a determination based on the presence or absence of the second operation as the LOCK operation (step S51). If the second operation is performed in step S51, after the second operation has been performed, the door of the vehicle 31 is locked and the authentication between the in-vehicle device 11 and the portable device 21 is released. Then, the control circuit 22 determines that a series of vehicle operations are completed. Then, the procedure proceeds to step S53 and the portable device battery remaining amount detection circuit 26 confirms the battery remaining amount value of battery 29.

In step S51, if the second operation is not performed, next, the control circuit 22 performs a determination based on the presence or absence of deauthentication (step S52). If there is no deauthentication in step S52, the control circuit 22 determines that a series of vehicle operations are continued, and the procedure returns to step S50. Then, vehicle operation by the portable device 21 can be performed continuously. In step S52, for example, if the authentication between the in-vehicle device 11 and the portable device 21 is released because the user 41 possessing the portable device 21 moves away from the vehicle 31 and the like, the control circuit 22 determines that a series of vehicle operations are completed. Then, the battery remaining amount detection circuit 26 of the portable device confirms the remaining amount value of the battery 29 (step S53).

Next, the control circuit 22 performs a third determination (determination as to whether the function of the portable device 21 can be maintained) based on the remaining amount value of the battery 29 (step S54). If the battery remaining amount value is at a level at which the function of the portable device 21 can be maintained in S54, the procedure returns to step S42 and the portable device 21 stops the standby function again and transits to the sleep mode. If the battery remaining amount value is at a level at which the function of the portable device 21 cannot be maintained in S54, the portable device 21 stops the function of the passive keyless system 1 (step S55). Then, the operation of the portable device 21 is completed.

If the battery 29 is replaced with a new battery after the operation of the portable device 21 is completed, the portable device 21 starts the operation at the normal time again.

Next, the effect of the present embodiment will be described. In the passive keyless system 1 of the present embodiment, if the remaining amount value of the battery 29 is less than the reference value (when the battery remaining amount is reduced), the portable device 21 stops the standby function. Therefore, it is possible to suppress the power consumption required to activate the standby function. Even when the portable device 21 stops the standby function, it is possible to restore the standby function as necessary according to the performance of the first operation as an UNLOCK operation by pressing the first operation button 27 of the portable device 21. After the portable device 21 restores the standby function and a series of vehicle operations are performed, it is possible to stop the standby function again according to the performance of the second operation as a LOCK operation by pressing the second operation button 28 of the portable device 21. Therefore, even when the standby function is restored as necessary, it is possible to minimize power consumption required to activate the standby function. As a result, it is possible to suppress the power consumption of the portable device 21.

Further, in view of easiness of carrying, it is desirable that the portable device 21 be compact and thus the battery 29 incorporated in the portable device 21 also be compact. If the battery 29 is miniaturized, the battery capacity of the battery 29 is reduced. Since the reduced capacity of the battery becomes a factor to shorten a usable period of the portable device 21 without battery replacement, it becomes more important to suppress the power consumption of the portable device 21. Therefore, the effect of the present embodiment described above is particularly effective in miniaturization of the portable device 21.

In addition, in the passive keyless system 1 of the present embodiment, even when the remaining amount value of the battery 29 is less than the reference value and the portable device 21 stops the standby function, it is possible to restore the standby function according to the first operation as an UNLOCK operation. The UNLOCK operation is an operation intended for unlocking of the vehicle 31. Therefore, it is possible to restore the standby function before the user 41 gets in the vehicle 31. Then, after the portable device 21 restores the standby function and a series of vehicle operations are performed, it is possible to stop the standby function again according to the second operation as a LOCK operation. The LOCK operation is an operation intended for locking the vehicle 31. Therefore, after a series of vehicle operations are completed and the user 41 gets out of the vehicle 31, it is possible to stop the standby function. As a result, even when the remaining amount value of the battery 29 is less than the reference value (at the time of low battery remaining amount), the operations for performing the stop and the restoration of the standby function are limitedly performed at the time of unlocking and locking of a door, and thus it is possible to suppress an increase in troublesome operations.

Next, the modification example of the present invention will be described. In the present modification example, the same configurations and the same procedures as in the embodiment described above are indicated by the same reference numerals, and thus a detailed description thereof will not be repeated.

Figure 8:
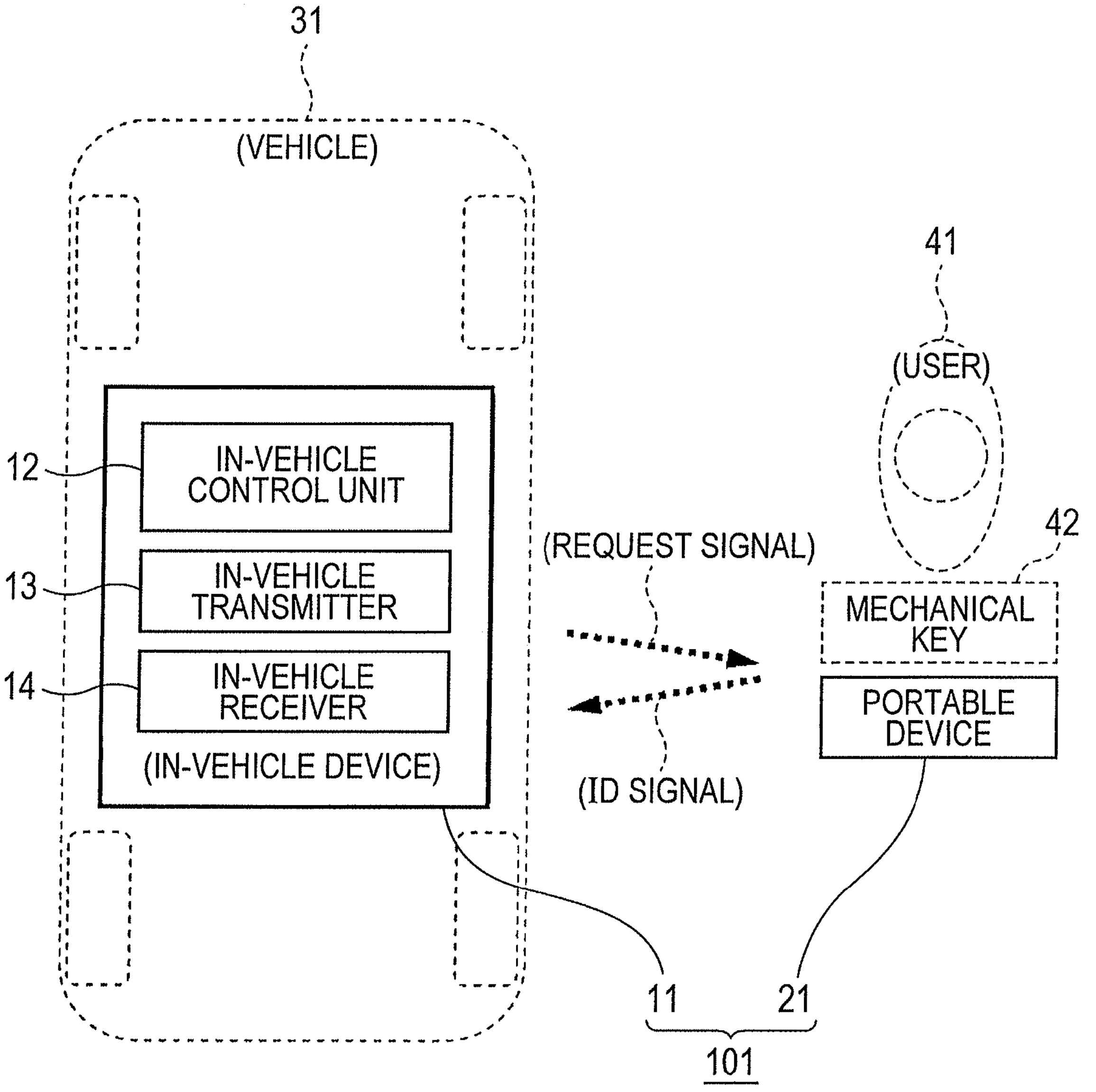
FIG. 8 is an explanatory diagram showing a configuration of a passive keyless system according to a modification example of the present invention.

First, a configuration of a passive keyless system 101 according to the present modification example will be described using FIG. 8. FIG. 8 is an explanatory diagram showing a configuration of the passive keyless system 101 according to the modification example of the present invention.

As shown in FIG. 8, the passive keyless system 101 includes an in-vehicle device 11 and a portable device 21. The in-vehicle device 11 includes an in-vehicle control unit 12, an in-vehicle transmitter 13, and an in-vehicle receiver 14. The in-vehicle device 11 is mounted on the vehicle 31. The user 41 possesses the portable device 21 along with a mechanical key 42. In this manner, the configuration of the passive keyless system 101 is the same as the configuration of the passive keyless system 1 according to the embodiment described above.

However, in the present modification example, even when the remaining amount value of the battery 29 is the reference value or more, if the second operation as the LOCK operation is performed when the portable device 21 is in the standby mode, after the second operation is performed, the portable device 21 is set to stop the standby function and to transit from the standby mode to the sleep mode. Then, if a first operation as the UNLOCK operation is performed after the second operation is performed and the portable device 21 transits to the sleep mode, the portable device 21 is set to restore the standby function and to transit from the sleep mode to the standby mode after the first operation is performed. Such switching of the operation modes is used, for example, when the portable device 21 is not used (hereinafter, referred to as non-use time).

Figure 9:
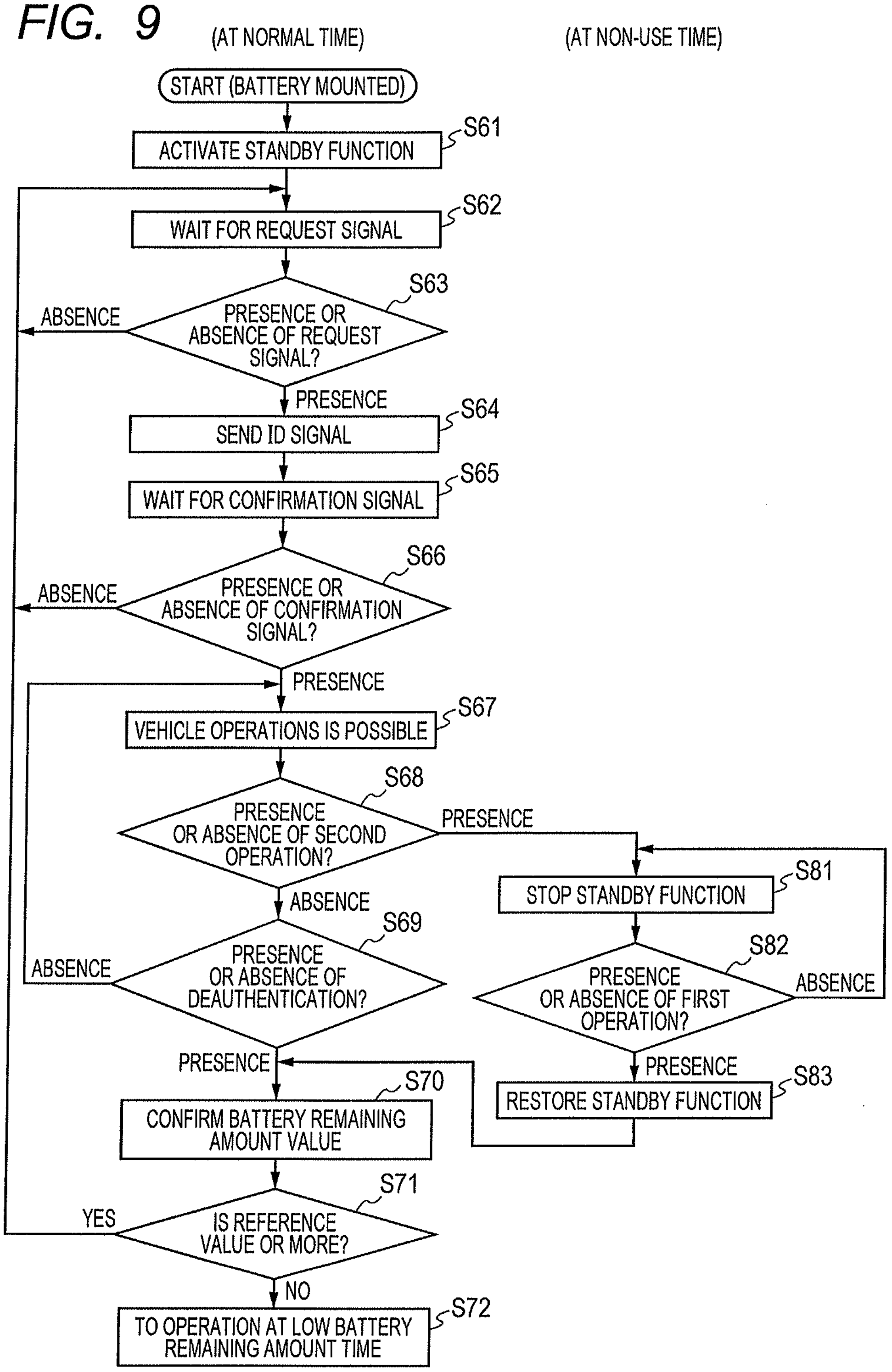
FIG. 9 is a flowchart showing an operation procedure of the portable device according to the modification example of the present invention.
Figure 10:
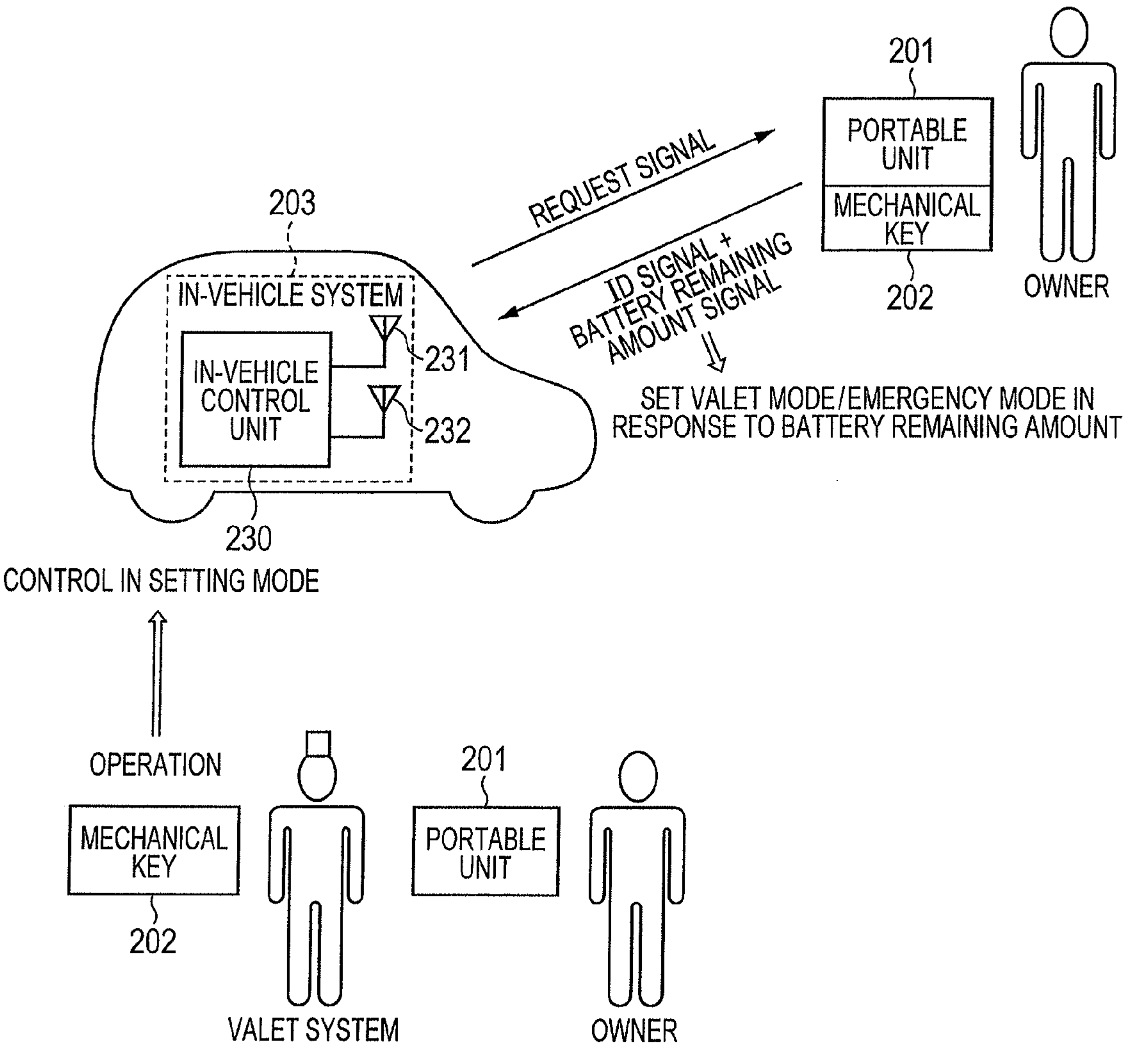
FIG. 10 is an explanatory diagram showing a passive keyless system in the related art according to Japanese Unexamined Patent Application Publication No. 2006-225975.

Next, the operation procedure of the portable device 21 according to the present modification example will be described using FIG. 9. FIG. 9 is a flowchart showing the operation procedure of the portable device 21 according to the modification example of the present invention. FIG. 9 shows the operation from when a new battery 29 is mounted on the portable device 21 up to when the remaining amount of the battery 29 is reduced and the battery remaining amount value is less than the reference value. In FIG. 9, steps S61 to S71 correspond to the operation at the normal time. Steps S81 to S83 correspond to the operation when not in use.

Further, in the present modification example, operations when the remaining amount value of the battery 29 is the reference value or more and operations other than the operations when not in use will be described as the operation at the normal time. In addition, since the operations of the portable device 21 at the time of low battery amount are the same as the operations (steps S41 to S55) of the portable device 21 at the time of low battery amount in the embodiments described above, the detailed description will not be repeated.

In the present modification example, the portable device 21 operates, for example, according to the procedure shown in FIG. 9. First, the operation of the portable device 21 at the normal time will be described. A new battery 29 is mounted on the portable device 21 and the portable device 21 starts an operation in a standby mode. The portable device 21 activates the standby function (step S61). Then, the reception circuit 23 waits for the request signal from the in-vehicle transmitter 13 (step S62).

Next, the control circuit 22 performs a determination based on the presence or absence of reception of the request signal (step S63). If there is no reception of the request signal in step S63, the procedure returns to step S62 and the reception circuit 23 continues to wait for the request signal. If there is reception of the request signal in step S63, the transmission circuit 24 sends the ID signal to the in-vehicle receiver 14 (step S64). Then, the reception circuit 23 waits for a confirmation signal on the establishment of an authentication from the in-vehicle transmitter 13 (step S65).

Next, the control circuit 22 performs a determination based on the presence or absence of the confirmation signal (step S66). If there is no reception of the confirmation signal within a predetermined time in step S66 (a case where authentication is not established), the procedure returns to step S62, the reception circuit 23 waits for the request signal again. If there is reception of the confirmation signal within a predetermined time in step S66 (a case where authentication is established), the vehicle operations using the portable device 21 becomes possible and a series of vehicle operations using the portable device 21 are performed (step S67). Then, the control circuit 22 performs a determination based on the presence or absence of the second operation as the LOCK operation (step S68).

In step S68, if the second operation at the normal time is performed, after the second operation is performed, the procedure proceeds to step S81 and transits to the operation when not in use. Then, the portable device 21 stops the standby function, transits to the sleep mode and waits in the sleep mode. Then, the control circuit 22 performs determination based on the presence or absence of the first operation as the UNLOCK operation (step S82). If the first operation is not performed in step S82, the procedure returns to step S81 and the portable device 21 continues to wait in the sleep mode. If the first operation is performed in step S82, after the first operation is performed, the portable device 21 restores the standby function and transits to the standby mode (step S83). Then, the procedure proceeds to step S70 and returns to the operation at the normal time.

In step S68, if the second operation is not performed, next, the control circuit 22 performs a determination based on the presence or absence of deauthentication (step S69). If there is no deauthentication in step S69, the control circuit 22 determines that a series of vehicle operations are continued, and the procedure returns to step S67. Then, vehicle operation by the portable device 21 can be performed continuously. In step S69, for example, if the authentication between the in-vehicle device 11 and the portable device 21 is released because the user 41 possessing the portable device 21 moves away from the vehicle 31 and the like, the control circuit 22 determines that a series of vehicle operations are completed.

Next, the battery remaining amount detection circuit 26 confirms the remaining amount value of the battery 29 (step S70). Then, the control circuit 22 performs a first determination based on the remaining amount value of the battery 29 (step S71). If the battery remaining amount value is the reference value or more in step S71, the procedure returns to step S62 and the reception circuit 23 waits for the request signal again. If the battery remaining amount value is less than the reference value in step S71, the portable device 21 transits to the operation at the time of low battery remaining amount. Since the operation of the portable device 21 at the time of low battery amount is the same as the operation of the portable device 21 at the time of low battery amount in the embodiments described above (step S41 to step S55), the description thereof will not be repeated.

In the present modification example, in this manner, even when the remaining amount value of the battery 29 is the reference value or more, if the second operation as the LOCK operation is performed, the portable device 21 can stop the standby function and transit from the standby mode to the sleep mode.

Next, the effect of the present modification example will be described. In the passive keyless system 101 of the present modification example, even when the remaining amount value of the battery 29 is the reference value or more, the portable device 21 can stop the standby function according to the performance of the second operation as a LOCK operation by pressing the second operation button 28 of the portable device 21. After the portable device 21 stops the standby function, the portable device 21 can restore the standby function according to the performance of the first operation as an UNLOCK operation by pressing the first operation button 27 of the portable device 21. Therefore, when the portable device 21 is not used (when not in use), even when the remaining amount value of the battery 29 is the reference value or more, the portable device 21 can stop the standby function, thereby suppressing the power consumption required for activating the standby function. As a result, it is possible to further suppress the power consumption of the portable device 21.

The longer the period when the portable device 21 is not used (hereinafter, referred to as non-use period), the larger these effects. Therefore, for example, when the non-use period is a few weeks or more because of a long trip or the like, a particularly large effect is achieved. In addition, even when the non-use period per one time is as short as a few hours, if the stop and the restoration of the standby function are performed very frequently, it is possible to increase the effect.

In addition, in the passive keyless system 101 of the present modification example, it is possible to stop the standby function according to the second operation as the LOCK operation. The LOCK operation is an operation for locking the vehicle 31. Therefore, after a series of vehicle operations are completed and the user 41 gets out of the vehicle 31, it is possible to stop the standby function. Then, after the standby function is stopped, it is possible to restore the standby function according to the first operation as an UNLOCK operation. The UNLOCK operation is an operation for unlocking the vehicle 31. Therefore, it is possible to restore the standby function before the user 41 gets in the vehicle 31. As a result, even when the standby function is stopped when the portable device 21 is not used (non-use time), the operations for performing the stop and the restoration of the standby function are limitedly performed at the time of unlocking and locking of a door, and thus it is possible to suppress an increase in troublesome operations.

Although the foregoing description relates to the embodiments and the modification example of the present invention, without being limited to the embodiments and the modification example described above, the present invention will be appropriately changed without departing from the scope of the present invention.

In the embodiments and the modification example described above, the vehicle operation which is possible when an authentication between the in-vehicle device 11 and the portable device 21 is established may include, for example, vehicle operations, such as flashing lights and trunk locking and unlocking in addition to locking and unlocking of a door of a vehicle and start-up of an engine.

Further, in the embodiments and the modification example described above, for example, a plurality of in-vehicle transmission antennas 13*a* may be connected to the in-vehicle transmitter 13. More reliable transmission of the first wireless signal SG1 to the portable device 21 is possible by the plurality of in-vehicle transmission antennas 13*a*.

Furthermore, in the embodiments and the modification example described above, for example, a plurality of in-vehicle reception antennas 14*a* may be connected to the in-vehicle receiver 14. More reliable reception of the second wireless signal SG2 from the portable device 21 is possible by the plurality of in-vehicle reception antennas 14*a*.

Furthermore, in the embodiments and the modification example described above, the portable device 21 may have outer shapes other than a substantially cuboid. For example, the portable device 21 may have an outer shape of an oval plate shape. In addition, the operation surface 21*a* of the portable device 21 may not be flat. For example, the operation surface 21*a* may be a convex surface with a central portion swelled.

Furthermore, in the embodiments and the modification example described above, the battery 29 may be a button-type battery. In addition, the battery 29 may be a rechargeable battery.

In addition, in the embodiments and the modification example described above, the confirmation of the battery remaining amount value is performed not only after the completion of vehicle operations, but also, for example, periodically during stand-by of the request signal or during the vehicle operations. The user can sense more accurately the battery remaining amount value and make a better appropriate determination.

In addition, in the embodiments and the modification example described above, the first operation for restoring the standby function may be operations other than the UNLOCK operation. For example, the portable device 21 further includes a third operation button intended for an operation different from the UNLOCK operation, and the portable device 21 may be set to restore the standby function after the third operation button is pressed.

In addition, in the embodiments and the modification example described above, the second operation for stopping the standby function may be operations other than the LOCK operation. For example, the portable device 21 further includes a fourth operation button intended for an operation different from the LOCK operation, and the portable device 21 may be set to stop the standby function after the fourth operation button is pressed.

It should be understood by those skilled in the art that various modifications, combinations, sub-combinations and alterations may occur depending on design requirements and other factors insofar as they are within the scope of the appended claims of the equivalents thereof.

What is claimed is:

1. A passive keyless system comprising:

an in-vehicle control unit that is mounted on a vehicle;

an in-vehicle transmitter that is mounted on the vehicle and wirelessly sends a request signal;

a portable device that is activated by a battery, has a standby function of receiving the request signal, and sends an ID signal when the request signal is received; and an in-vehicle receiver that is mounted on the vehicle and receives the ID signal, wherein the in-vehicle control unit allows various operations of the vehicle when an authentication of the ID signal received by the in-vehicle receiver is established, wherein when a remaining amount value of the battery is less than a reference value, the portable device stops the standby function, restores the standby function according to an operation using the portable device, and stops the standby function again after the standby function is restored, wherein unlocking and locking of a door of the vehicle are possible by the operation using the portable device, and wherein when the battery remaining amount value is less than the reference value and the standby function is stopped, the portable device restores the standby function according to an operation for performing the unlocking and stops the standby function again according to an operation for performing the locking.

2. The passive keyless system according to claim 1, wherein even when the battery remaining amount value is the reference value or more, the portable device stops the standby function according to an operation using the portable device, and restores the standby function again after the standby function is stopped.

3. The passive keyless system according to claim 2, wherein the portable device performs unlocking and locking of a door of the vehicle, and wherein even when the battery remaining amount value is the reference value or more, the portable device stops the standby function according to the operation for performing the locking and restores the standby function again according to the operation for performing the unlocking.

* * * * *